(12) United States Patent
de Gaillard

(10) Patent No.: US 6,478,368 B1
(45) Date of Patent: Nov. 12, 2002

(54) PASSENGER CAR WITH A VARIABLE ROOF/REAR AREA

(75) Inventor: Francois de Gaillard, Mouilleron en pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/661,367

(22) Filed: Sep. 13, 2000

(30) Foreign Application Priority Data

Sep. 13, 1999 (DE) .......................................... 199 43 716

(51) Int. Cl.⁷ ............................. B60J 7/043; B60J 7/14
(52) U.S. Cl. .................... 296/216.02; 296/219
(58) Field of Search ..................... 296/216.02, 222, 296/219

(56) References Cited

U.S. PATENT DOCUMENTS

| 4,009,902 A | * 3/1977 | Yoxtheimer ............ 296/216.02 |
| 4,630,858 A | 12/1986 | Bez |
| 5,518,288 A | 5/1996 | Deklotz |
| 6,033,012 A | 3/2000 | Russke et al. ............... 296/219 |

FOREIGN PATENT DOCUMENTS

| DE | 40 10 276 | 10/1990 | |
| DE | 196 31 213 | 12/1997 | |
| FR | 2699868 | * 7/1994 | ................ 296/219 |
| FR | 2 748 241 | 11/1997 | |
| GB | 173626 | 1/1922 | |

* cited by examiner

Primary Examiner—Dennis H. Pedder
(74) Attorney, Agent, or Firm—Nixon Peabody LLP; David S. Safran

(57) ABSTRACT

The invention relates to a motor vehicle having a variable roof/rear area, especially a station wagon or a sport-utility vehicle having a rear cargo space, in which a cover of the roof/rear area and a rear part can be opened, and the cover pivoted downward about an axis transverse to the surface of the roof/rear area.

15 Claims, 6 Drawing Sheets

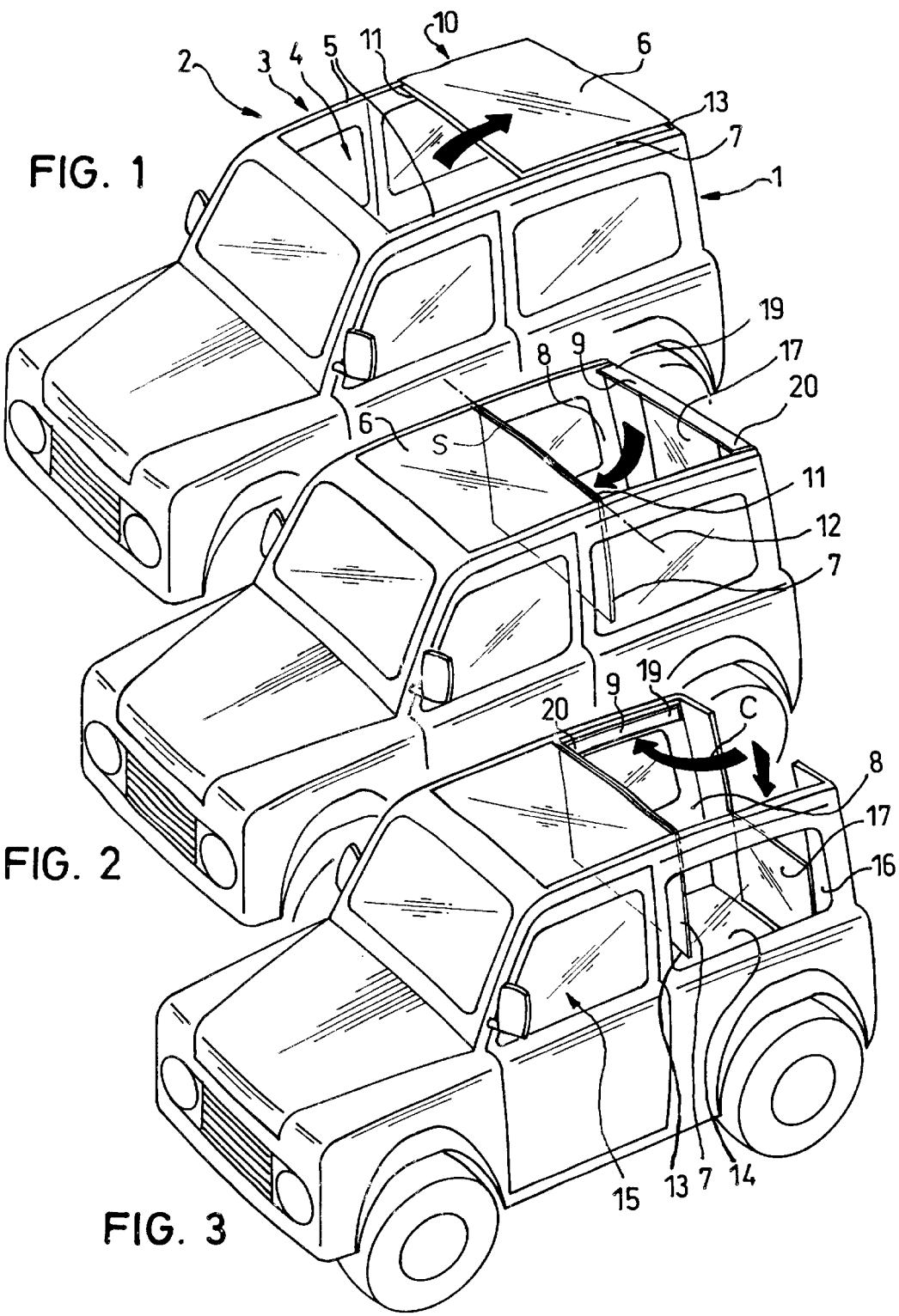

PASSENGER CAR WITH A VARIABLE ROOF/REAR AREA

BACKGROUND OF THE INVENTION

1. Field of the Invention

The invention relates to a passenger car having a variable roof/rear area, especially a station wagon or sport-utility vehicle with a rear cargo space, whereby the cover of the rear roof section and the rear part can be opened.

2. Description of the Related Art

Published German Patent Application No. DE 34 20 349 A1 discloses a station wagon in which a rear roof part can be moved forward or completely removed to open the roof cutout. A rear door is coupled via two arms which are used as frames for the movable rear window to the top, rear end area of the vehicle superstructure. When the rear window is lowered and the roof part is pushed forward, a large roof and rear opening is formed for transport of bulky items.

Published German Patent Application No. EP 0 850 792 A1 discloses a motor vehicle with a roof surface which has at least two plate parts which can be moved into an open position and which lie parallel and flat in the closed position. By means of a guide mechanism the plate parts can be moved out of the flat parallel position into a packing position which is completely inserted into a body space, a position in which they are spaced towards the roof area and are arranged essentially vertically and parallel to one another. The guide mechanism for folding and vertically lowering the plate parts is made very complex. In addition, during opening the plate parts are raised vertically, transversely to the direction of travel, first above the roof, before they are vertically lowered.

SUMMARY OF THE INVENTION

The primary object of the invention is to devise the aforementioned passenger car in which the cover of the rear roof section can be opened with different movement possibilities from the closed position and can be stowed in a space-saving manner.

This object is achieved by designing the cover of the rear roof section in manner such that the cover can be pivoted downward out of the roof surface around a lengthwise or transverse axis which runs in the area of the roof. Thus a pivot bearing of simple structure is sufficient for the bearing of the cover. Complex movement mechanisms are not necessary. The pivot bearing can be located on parts of the roof or in the roof area depending on the respective pivot axis which with reference to the vehicle is a lengthwise axis or a transverse axis. The pivot axis can be offset to a certain extent by the pivot bearing when the cover is swiveled in order to achieve tight engagement of the cover edge on the bordering component by a matched motion sequence. The cover can also be folded down while travelling since it takes place within the outline of the vehicle and can be done without significantly increasing the air resistance. Thus, when the cover and the rear part are opened a cargo surface and a cargo space for bulky articles are formed, as is known of a pickup truck.

In one preferred embodiment, the cover of the rear roof section is pivotally mounted on a side roof member, is detachably fixed on the opposite roof member, and, after detachment, can be pivoted down around a lengthwise axis on the pivot bearing especially into a roughly vertical position. Accordingly, the cover is pivoted onto the side vehicle interior, for example in front of a side window. With a wide roof and a comparatively flat rear or cargo space a cover with reduced width can be installed which is spaced away from the side roof members and which is supported inwardly on the roof. One alternative embodiment calls for the cover of the rear roof section to be divided into a right and a left cover part which is pivotally mounted on a right and a left side roof member and which can be folded down from a closed position in which they adjoin one another with their respective pivot bearings around the pertinent lengthwise axes into an especially roughly vertical lowered position.

According to another preferred embodiment, the cover of the rear roof section in the area of its front edge is supported on the roof to be pivoted about a transverse axis and folded down. In this embodiment the cover in its substantially vertically pivoted-down position can form a rear-side separation of the front passenger compartment. To stiffen the body or to attach a load carrying means a transverse roof member can be detachably mounted on the back end of the roof on which the closed cover tightly fits. The transverse roof member then has preferably a seal on which the cover fits. To produce a continuous roof opening, it is feasible if the transverse roof member is mounted on the roof on the one hand with a rocker bearing and on the other hand with a detachable attachment so that it can be folded down into a roughly vertical position. But alternatively the transverse roof member can also be removed entirely from the vehicle by detachment on its two ends. The rear part to be opened can be a rear window which is supported to be movable in a rear door or rear flap and can be lowered into a bottom rear hatch part or door part.

In another embodiment, the cover of the rear roof section in the area of its rear edge is supported on the roof to be able to swivel around a transverse axis and to be folded down. The rear part to be opened can also be a rear window which is supported to be movable on the rear and which can be lowered into a lower rear structure. Preferably, the cover in the area of its rear edge is pivotally mounted on the top edge of the rear window, can be pivoted down around a transverse axis to the inside of the rear window and can be lowered with it into the lower rear structure.

In each embodiment, the cover can be made of a transparent material, preferably glass. When the area of the top cover is large it can also be divided into two or more covers which, when hinged to one another, are folded onto one another and then jointly pivoted about an axis located on the edge of the roof opening to the inside into the cargo space to be cleared onto one of its walls or doors.

When the foldable and movable parts can also be manually moved, it is preferred if one or more preferably electromechanical drives in a controlled sequence of motion move the cover or covers and the rear window or the cover or covers and the transverse roof member and optionally a rear window in a rear door.

In addition to the rear cover there can be a front sliding roof cover which can be moved over the rear cover both in its closed and also open, pivoted-down position.

BRIEF DESCRIPTION OF THE DRAWINGS

FIG. 1 is a perspective view of a sport-utility vehicle with an open roof arrangement/rear arrangement and an opened sliding roof cover from the front and to one side;

FIG. 2 is a front perspective view of the sport-utility vehicle with a rear cover which is folded inwardly from the front and to one side;

FIG. 3 is a perspective view of the sport-utility vehicle with a cargo area which has been opened in the manner of a pickup truck from the front and to one side;

DETAILED DESCRIPTION OF THE PREFERRED EMBODIMENT

Figure 4:
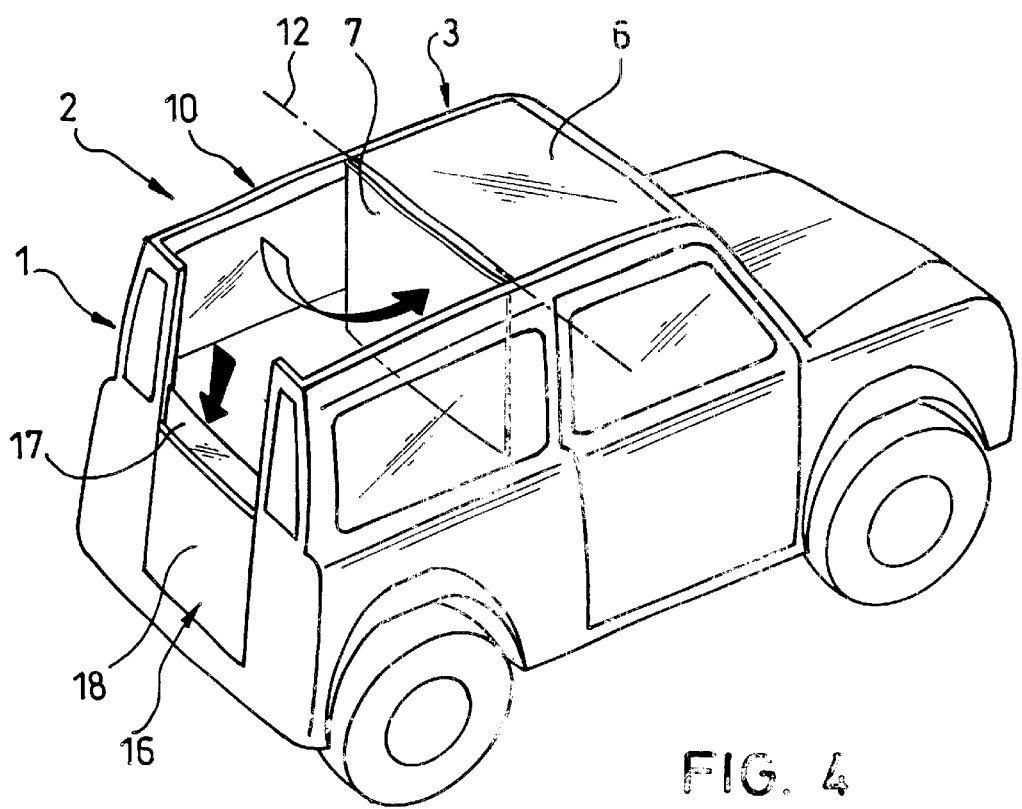
FIG. 4 is a perspective view of the sport-utility vehicle shown in FIGS. 1–3 from the rear and to one side.

Referring initially to FIGS. 1–3 of the drawings, a passenger car, for example, in the manner of a closed sport-utility vehicle with a high, box-shaped rear 1 and an essentially flat roof 2 in a front roof section 3, has a front roof opening 4 which is covered with a sliding roof cover 6 which is supported to be able to move on side roof members 5 and can be moved from a closed position into the open position shown over a rear cover 7 which covers a rear roof opening 8 in a rear roof section 10 which extends as far as to a rear transverse roof member 9 on the rear 1.

The rear cover 7 is pivotally mounted with a bearing means which supports the cover 7 in the area of its front edge 11 on either side on side roof members 5 around the transverse axis 12 of the vehicle, for example by laterally projecting journals which fit into the bearings on the roof members 5. In its closed position the cover 7 on its rear edge 13 is locked on the rear transverse roof member 9 or on either side on the roof members 5. As shown in FIG. 2, to open the rear roof opening 8 the lock is released and the cover 7 is pivoted about the transverse axis 12 down into a substantially vertical position. The cover 7 which is pivoted down is then either locked on a cargo surface 14 or on either side on the body. A front driver and passenger area 15 is separated by the folded-down cover 7 from the cargo surface 14. A seal S (FIG. 2) in the area of the transverse axis 12 seals the front edge 11 of the cover 7 against the sliding roof cover 6. On the two lateral vehicle insides and on the cargo surface 14 there is a sealing arrangement on which the cover 7 tightly fits. But optionally, regardless of the cover 7 begin pivoted down, there can be a separate partition between the driver and passenger area 15 and the cargo surface 14 which for its part in turn can be provided with displaceable windows and/or doors.

As shown in FIGS. 3 & 4, in the rear door 16 of the vehicle which is supported, for example, laterally for opening, a rear window 17 is accommodated to be able to move vertically and can be lowered from its top closed position into a bottom position lowered into the closed door part 18 by an electromechanical drive, for example, so that a cargo surface 14 is formed with a cargo space which is open in the roof area and in the top rear area in the manner of a pickup truck.

The rear transverse roof member 9 which is used for example as a load carrier and for example in traveling cross country can contribute to stiffening the body, is coupled on one end 19, for example, on the right end as shown in FIGS. 1–4, with a pivot joint on the right roof member 5 and on its other end 20, the left end, is detachably fixed on the left roof member 5. As shown in FIG. 3, after detachment the transverse roof member 9 can be pivoted forward on the right roof member 5 into a lowered position so that the rear cargo space, after lowering the rear window 17 and pivoting down the cover 7, is completely cleared to the top and to the rear. This opened position of the vehicle roof and of the top rear area is also shown in FIG. 4.

The sliding roof cover 6 and the rear cover 7 are preferably made of transparent material and especially glass. The sliding roof cover 6 can be pushed independently of the position of the rear cover 7, for example, by electrical activation in order to cover the area of the front roof opening 4 or selectively at least partially clear it.

Figure 5:
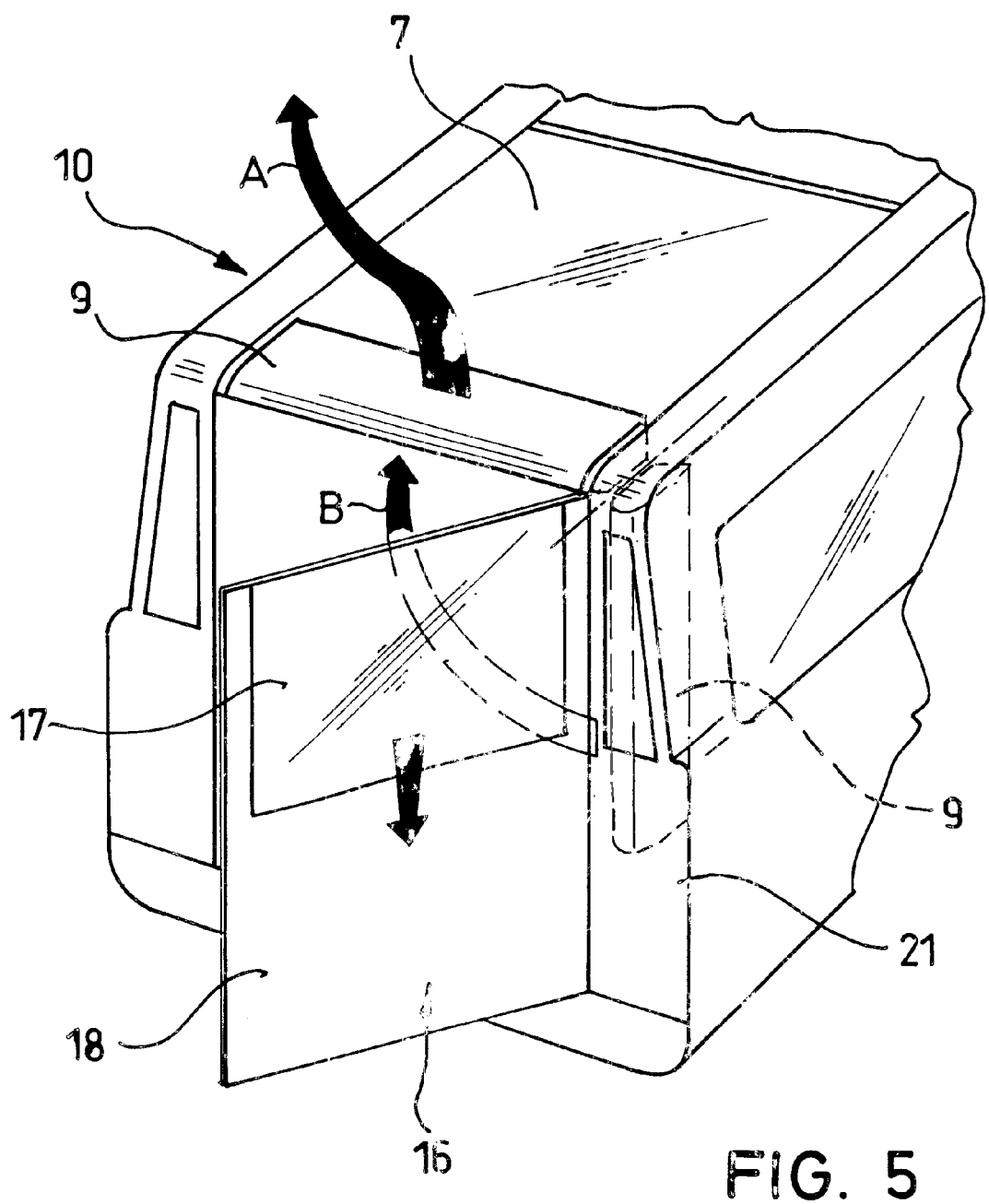
FIG. 5 is perspective view of a rear portion of the sport-utility vehicle according to another embodiment.

As illustrated in FIG. 5, in another embodiment the transverse roof member 9 can be completely removed from its arrangement on the back end of the roof 2 or of the rear roof section 10 after detachment on the bearing means and on the opposite mounting on the roof member, or, if the transverse roof member 9 can be fixed without a pivot being with bilateral attachment means, after releasing the two attachment means (arrow A). In addition, the transverse roof member 9 can be pivoted around its pivot bearing down into a roughly vertical position and can be lowered into a recess in the vehicle roughly on the C column 21. Here the transverse roof member 9 is moved such that it is pivoted past from its position above the rear door 16 on the inside of the rear door 16.

Figure 6:
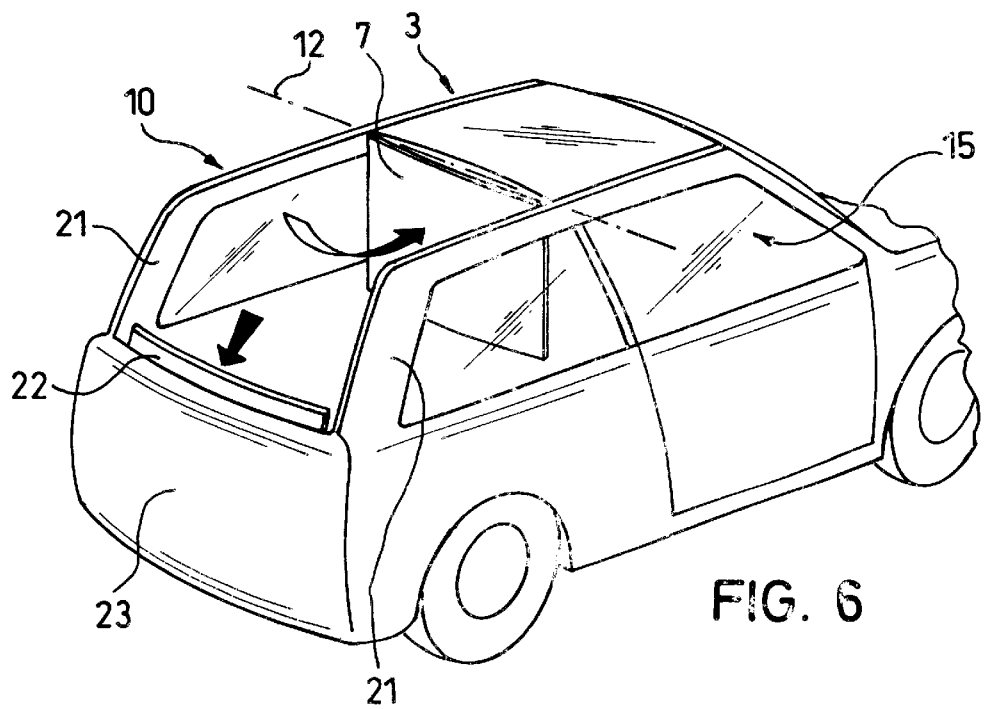
FIGS. 6–9 are perspective views of different embodiments of a roof arrangement of a station wagon from the rear and to one side.

In FIG. 6, a station wagon containing a comparable arrangement of the rear cover 7 on the rear roof section 10, the cover 7 can be pivoted about the transverse axis 12 and forms a roughly vertical separation to the passenger compartments rear window 22 is guided on either side on the C column 21 and/or in the rear structure 23 and can be lowered into the rear structure 23 so that the roof/rear area can be completely opened above the cargo surface 14. In this version, without a rear transverse roof member 9 first the rear window 22 which fits against and seals the bottom of the cover 7 is lowered by an amount which enables the rear edge of the cover 7 to be pivoted.

Figure 7:
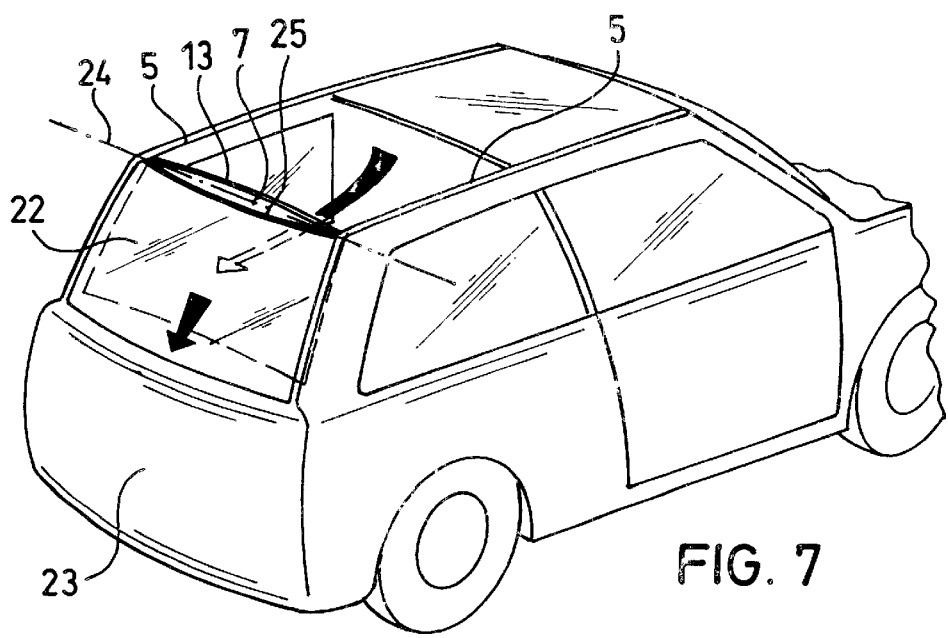

In the embodiment shown in FIG. 7, the cover 7 can be pivoted about the rear transverse axis 24 which runs in the area of its rear edge 13 and can be placed from the inside against the rear window 22. The rear window 22 and the cover 7 are jointly lowered into the rear structure 23. The cover 7 can be pivotally mounted in the area of its rear edge 13 on the two side roof members 5 or also on the rear window 22, and a seal which in the closed state seals the cover 7 on the rear window 22 can be attached both to the top edge 25 of the rear window 22 and also to the rear edge 13 of the cover 7.

Figure 8:
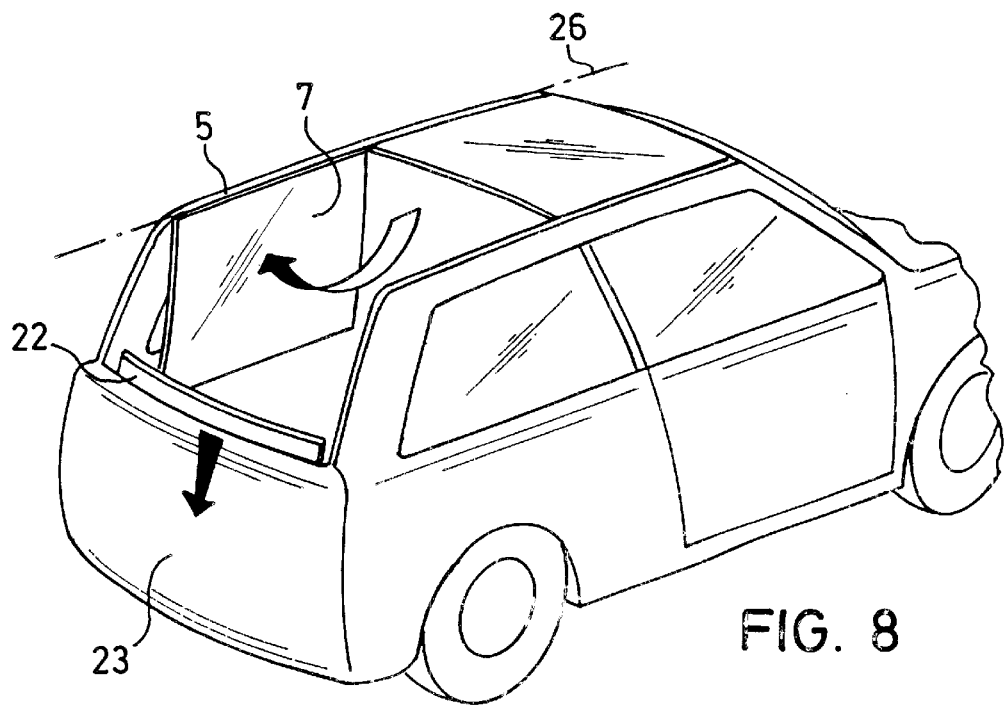

FIG. 8 shows the vehicle with a cover 7 which is pivotally attached to the left roof member 5 and which can be pivoted about the lengthwise axis 26 onto the left vehicle inner side, in the embodiment shown onto the left rear window.

Figure 9:
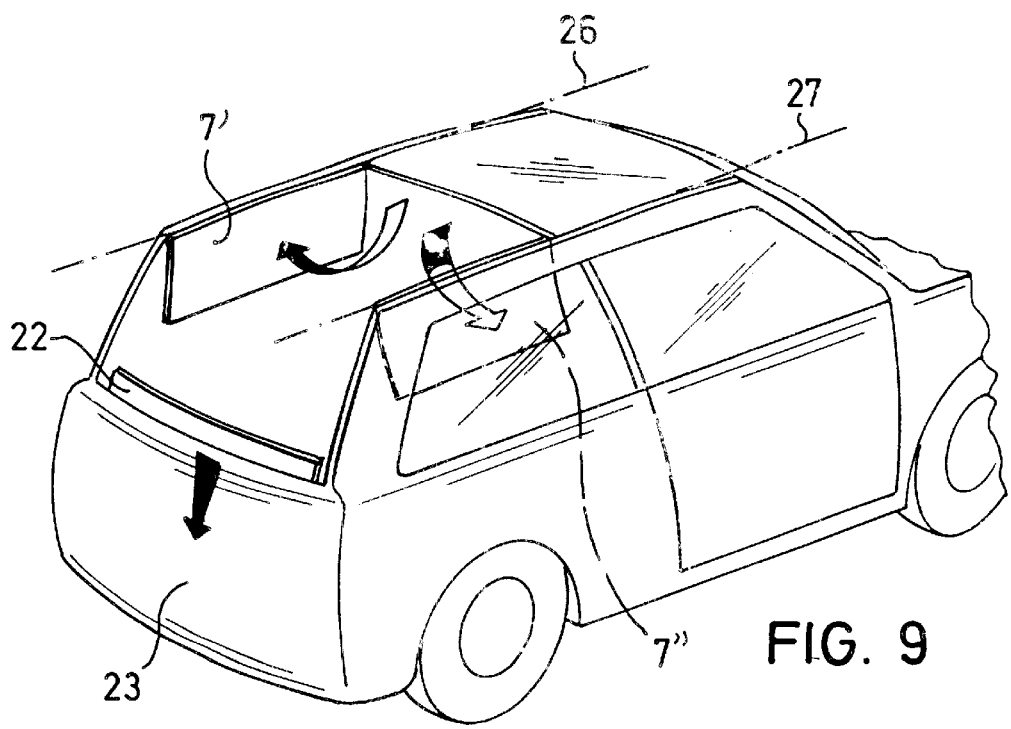

In the alternative embodiment shown in FIG. 9, the rear cover 7 is divided into left and a right cover 7' and 7" which in their closed position tightly adjoin one another in the roof surface and can be pivoted down for opening with their respective pivot bearing on the left and the right roof member 5 around the pertinent left and right lengthwise axis 26 and 27.

Figure 10:
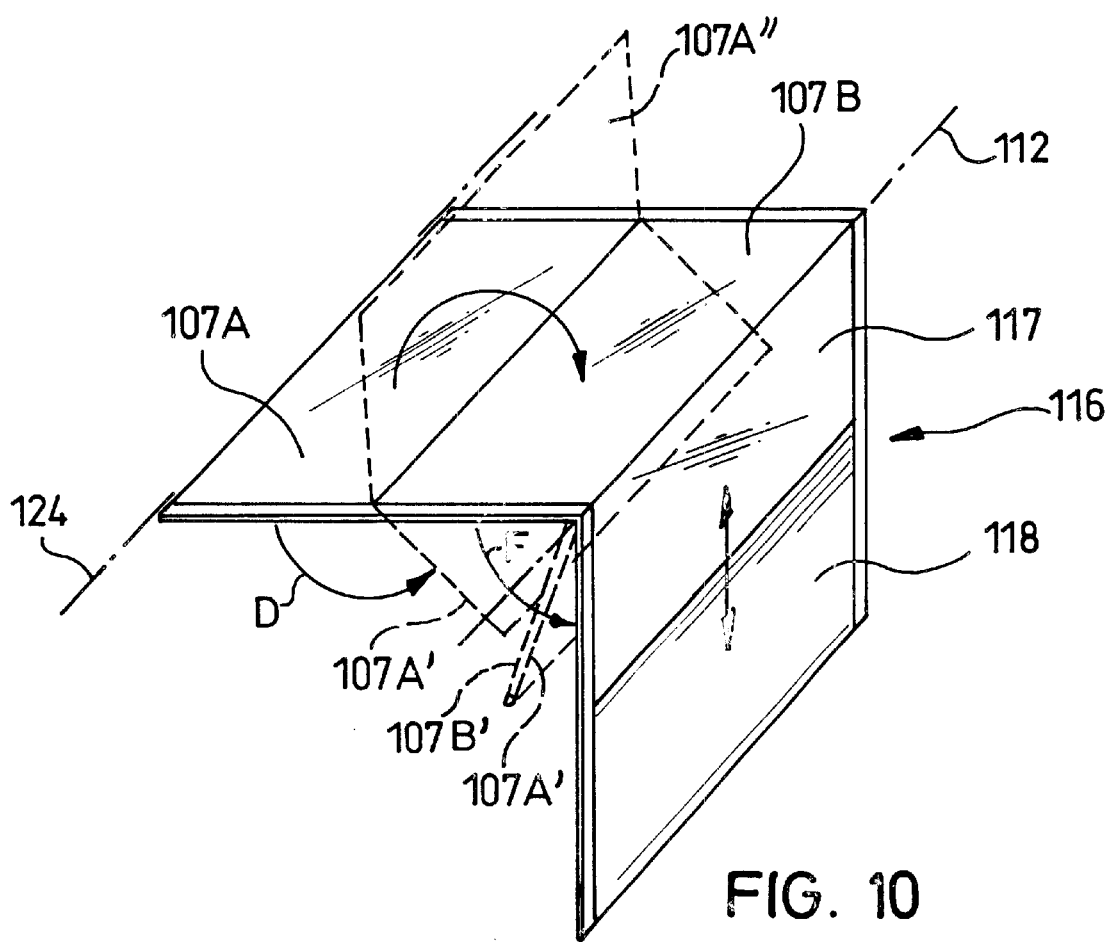
FIG. 10 shows an embodiment of a rear space cover having several cover parts.

FIG. 10 shows another embodiment of a rear space cover with several cover parts. Here, for purposes of simplification the adjacent parts have been omitted. Especially for larger roof surfaces, it is advantageous if the cover 7 which is one-piece in the preceding examples is divided into two or more cover sections 107A and 107B. These two cover elements 107A and 107B are joined to one another with a hinge axis which is preferably pivoted onto the rear cover 107B preferably folding in the front cover 107A down according to the outline 107A' in broken lines in FIG. 10 (arrow D). Next, the two covers 107A and 107B are pivoted about a rear pivot axis 112 which lies on the end of the roof area according to arrow F down onto the rear window 117 and then the entire package of the two covers 107A and 107B and the rear window 117 is lowered down into the rear structure 118.

Even if folding of the front cover 107A preferably takes place downward, in another outline 107A" shown by broken lines, it is illustrated that the two covers can also be folded over one another by pivoting the front cover 107A" upward.

Instead of folding together the two covers 107A and 107B to the rear likewise in a manner not shown the cover 107B can be folded, for example, after lowering the rear window 117 forward down under the front cover 107A, whereupon then the two covers 107A and 107B can be pivoted about a pivot axis which is located near the front edge of the front cover 107A.

While the present invention has been illustrated and described in connection with what is considered the most practical and preferred embodiments, it is understood that this invention is not limited to the embodiments disclosed herein but is intended to cover various arrangements included within the spirit and scope of the broadest reasonable interpretations and equivalent arrangements. For example, the described roof structure/rear structure is suitable for different vehicles such as sport-utility vehicles, stretch limousines, vans, all-wheel vehicles, small trucks and vehicles of this type in which a cargo space to be opened can be formed in the manner of a pickup truck so that the designation of the vehicle as a passenger car does not represent any limitation to a special vehicle type.

What is claimed is:

1. A motor vehicle having a front passenger compartment and a rear-end compartment, said rear-end compartment having a variable roof comprising at least one cover portion mounted on a rear section of said roof, and a rear part mounted on a rear door area of said motor vehicle; wherein said at least one cover portion is movable from a closed position in which said at least one cover portion is supported in a position parallel to said roof to a downward position whereby said at least one cover portion is movable into said rear-end compartment about an axis, that is fixed in a plane of said roof perpendicular to a longitudinal axis of the roof, into a position general perpendicular to said roof.

2. The motor vehicle as claimed in claim 1, wherein said at least one cover portion comprises a cover part pivotally mounted on a first side roof member and for detachable mounting to a second roof member positioned opposite to said first side roof member, said at least one cover portion being pivotally movable into a substantially vertical position extending in a longitudinal direction of the roof.

3. The motor vehicle as claimed in claim 2, wherein said at least one cover portion includes a right cover portion pivotally mounted to a first side roof member, and a left cover portion pivotally mounted to a second side roof member, said right cover portion and said left cover portion each being movable from a closed position in which respective edge portions of said right cover portion and said left cover portion adjoin one another into an substantially vertical lowered position in which said right cover portion and said left cover portion are substantially perpendicular to said roof.

4. The motor vehicle as claimed in claim 1, wherein said at least one cover portion includes an right cover portion pivotally mounted to a first side roof member, and a left cover portion pivotally mounted to a second side roof member, said right cover portion and said left cover portion each being movable from a closed position in which respective outer edges of said right cover portion and said left cover portion adjoin one another into an substantially vertical lowered position whereby said right cover portion and said left cover portion are substantially perpendicular to said roof.

5. The motor vehicle as claimed in claim 1, wherein a front edge of said at least one cover portion is pivotally supported on said roof in a manner such that said at least one cover portion is pivotally movable about an axis extending in a direction crosswise of said roof.

6. The motor vehicle as claimed in claim 5, wherein the front passenger compartment of said motor vehicle is separated from the rear-end compartment of said motor vehicle when said at least one cover portion is placed in said substantially vertical position.

7. A motor vehicle having a front passenger compartment and a rear-end compartment, said rear-end compartment having a variable roof comprising at least one cover portion mounted on a rear section of said roof, and a rear part mounted on a rear door area of said motor vehicle; wherein said at least one cover portion is movable from a closed position in which said at least one cover portion is supported in a position parallel to said roof to a downward position whereby said at least one cover portion is movable into said rear-end compartment about an axis in a plane of said roof into a position general perpendicular to said roof; and wherein a rear edge of said at least one cover portion is pivotally mounted on said roof in a manner such that said at least one cover portion is pivotally movable about an axis extending in a direction crosswise of said roof into a folded down position.

8. The motor vehicle as claimed in claim 1, further comprising a transverse roof member for detachable mounting on said roof and for supporting a rear edge portion of said at least one cover portion in a closed position.

9. The motor vehicle as claimed in claim 1, wherein said at least one cover portion is composed of a transparent material.

10. The motor vehicle as claimed in claim 1, wherein said rear part comprises a window movably mounted on the rear door between a top closed position and a bottom open position, whereby said window can be lowered and received into a section of said rear door.

11. A motor vehicle having a front passenger compartment and a rear-end compartment, said rear-end compartment having a variable roof comprising at least one cover portion mounted on a rear section of said roof, and a rear part mounted on a rear door area of said motor vehicle; wherein said at least one cover portion is movable from a closed position in which said at least one cover portion is supported in a position parallel to said roof to a downward position whereby said at least one cover portion is movable into said rear-end compartment about an axis in a plane of said roof into a position general perpendicular to said roof, wherein said rear part comprises a window movably mounted on the rear door and being vertically movable to a top closed position and a bottom position whereby said window can be lowered and received into an annular section of said rear door; and wherein a rear edge portion of said at least one cover portion is pivotally mounted on a top edge of said window in a manner such that said at least one cover portion is pivotally movable about an axis extending across said window and whereby said at least one cover portion can be lowered and received into said section of said rear door with said window.

12. A motor vehicle having a front passenger compartment and a rear-end compartment, said rear-end compartment having a variable roof comprising at least one cover portion mounted on a rear section of said roof, and a rear part mounted on a rear door area of said motor vehicle; wherein said at least one cover portion is movable from a closed position in which said at least one cover portion is supported in a position parallel to said roof to a downward position whereby said at least one cover portion is movable into said rear-end compartment about an axis in a plane of said roof into a position general perpendicular to said roof; wherein said rear part comprises a window movably mounted on the rear door and being vertically movable to a top closed position and a bottom position whereby said window can be lowered and received into an annular section of said rear door; and wherein said at least one cover portion includes at least two cover portions hingedly connected to one another in manner such that at least one of said at least two cover portions can be pivoted inwardly about an axis into a stowage space only after being folded together into a cover package.

13. The motor vehicle as claimed in claim 1, further comprising a roof cover being slidingly movable into a position covering said at least one cover portion.

14. The motor vehicle as claimed in claim 1, wherein said motor vehicle is one of a station wagon and a sport-utility vehicle and said rear-end compartment is a rear cargo space thereof.

15. The motor vehicle as claimed in claim 1, wherein said at least one cover portion includes a front cover portion and rear cover portion, said rear cover portion being pivotally mounted to pivot about a pivot axis parallel to a rear edge of the front cover portion, said rear cover portion being movable from a closed position in which the front and rear cover portions are essentially parallel to each other into a substantially vertical lowered position whereby said front cover portion and said rear cover are substantially perpendicular to each other; and wherein a seal is provided in an area of the pivot axis which seals a front edge of the rear cover portion relative to a rear edge of the front cover portion.

* * * * *